United States Patent [19]
Briggs et al.

[11] Patent Number: 5,983,837
[45] Date of Patent: Nov. 16, 1999

[54] BIRD COUNTER

[75] Inventors: Douglas V. Briggs; George C. Stevens, both of Northwood, N.H.

[73] Assignee: American Calan, Inc., Northwood, N.H.

[21] Appl. No.: 08/754,701

[22] Filed: Nov. 21, 1996

[51] Int. Cl.⁶ .................................................. A01K 29/00
[52] U.S. Cl. ........................................................... 119/845
[58] Field of Search .................................. 119/843, 845, 119/846

[56] References Cited

U.S. PATENT DOCUMENTS

| | | |
|---|---|---|
| 611,753 | 10/1898 | Hoskins . |
| 2,159,451 | 5/1939 | Richards ............................... 229/120.1 |
| 2,601,197 | 6/1952 | Wilson . |
| 3,014,608 | 12/1961 | Aylor ........................................ 217/36 |
| 3,095,992 | 7/1963 | Shreckhise . |
| 3,895,727 | 7/1975 | Rucker . |
| 3,921,588 | 11/1975 | Ledwell, Jr. . |
| 3,942,476 | 3/1976 | Napier ................................. 119/843 X |
| 3,958,536 | 5/1976 | Crowder ................................... 119/846 |
| 3,990,400 | 11/1976 | Shreckhise . |
| 3,993,026 | 11/1976 | Shreckhise . |
| 4,201,156 | 5/1980 | Kähler .................................... 119/846 |
| 4,467,745 | 8/1984 | Ledwell et al. . |
| 4,508,062 | 4/1985 | Berry et al. .............................. 119/846 |
| 4,513,689 | 4/1985 | Berry et al. .............................. 119/846 |
| 4,600,351 | 7/1986 | Nelson .................................... 414/331 |
| 4,669,423 | 6/1987 | van den Brink ........................ 119/846 |
| 4,736,710 | 4/1988 | Nicloai ................................. 119/846 X |
| 4,766,850 | 8/1988 | O'Neill .................................... 119/846 |
| 4,900,292 | 2/1990 | Berry et al. .............................. 474/84 |
| 5,101,767 | 4/1992 | Williams et al. ........................ 119/845 |
| 5,325,820 | 7/1994 | Briggs et al. ............................ 119/846 |

FOREIGN PATENT DOCUMENTS

| | | |
|---|---|---|
| 0 024 266 | 2/1981 | European Pat. Off. . |
| 2185172 | 7/1987 | United Kingdom . |
| 2205917 | 12/1988 | United Kingdom . |

OTHER PUBLICATIONS

KenTech Plastics, Inc.'s "Standard and Half–Door Coops," brochure dated Jan. 1993, 1 pg.

Bright Coop Co.'s "Easyload on the Farm" brochure (c. 1992), 2 pgs.

Anglia Autoflow Ltd.'s "Easyload" brochure, (c. 1992), 8 pgs.

American Standard's "Mk II Module Details" brochure (c. 1992).

No. 9106534.2, Poultry–Handling Assembly, dated Mar. 27, 1991 pp. 1–5 with one sheet of drawings.

No. 9022574.9, Poultry–Handling Assembly, dated Oct. 17, 1990 cover page and pp. 1–13 with five sheets of drawings.

Martha Middleton, Chicken–pickin', the easy way, The Concord Monitor, Concord, N.H., pp. D1 and D3, Circa. 1990.

Automatic Chicken Catcher, Agritec, pp. 1–7, Circa. 1990, United Kingdom.

*Primary Examiner*—Robert P. Swiatek
*Attorney, Agent, or Firm*—Sennigner, Powers, Leavitt & Roedel

[57] ABSTRACT

A bird counter capable of separating, detecting, and counting birds. A counterrotating rotor mechanism having flexible fingers receives the birds into a space between the rotors substantially one at a time to separate the birds. The counterrotating rotor mechanism expels the birds from the space substantially one at a time. A fiber optic bird detecting system detects the number of expelled birds after the birds have been separated by the counterrotating rotors.

21 Claims, 4 Drawing Sheets

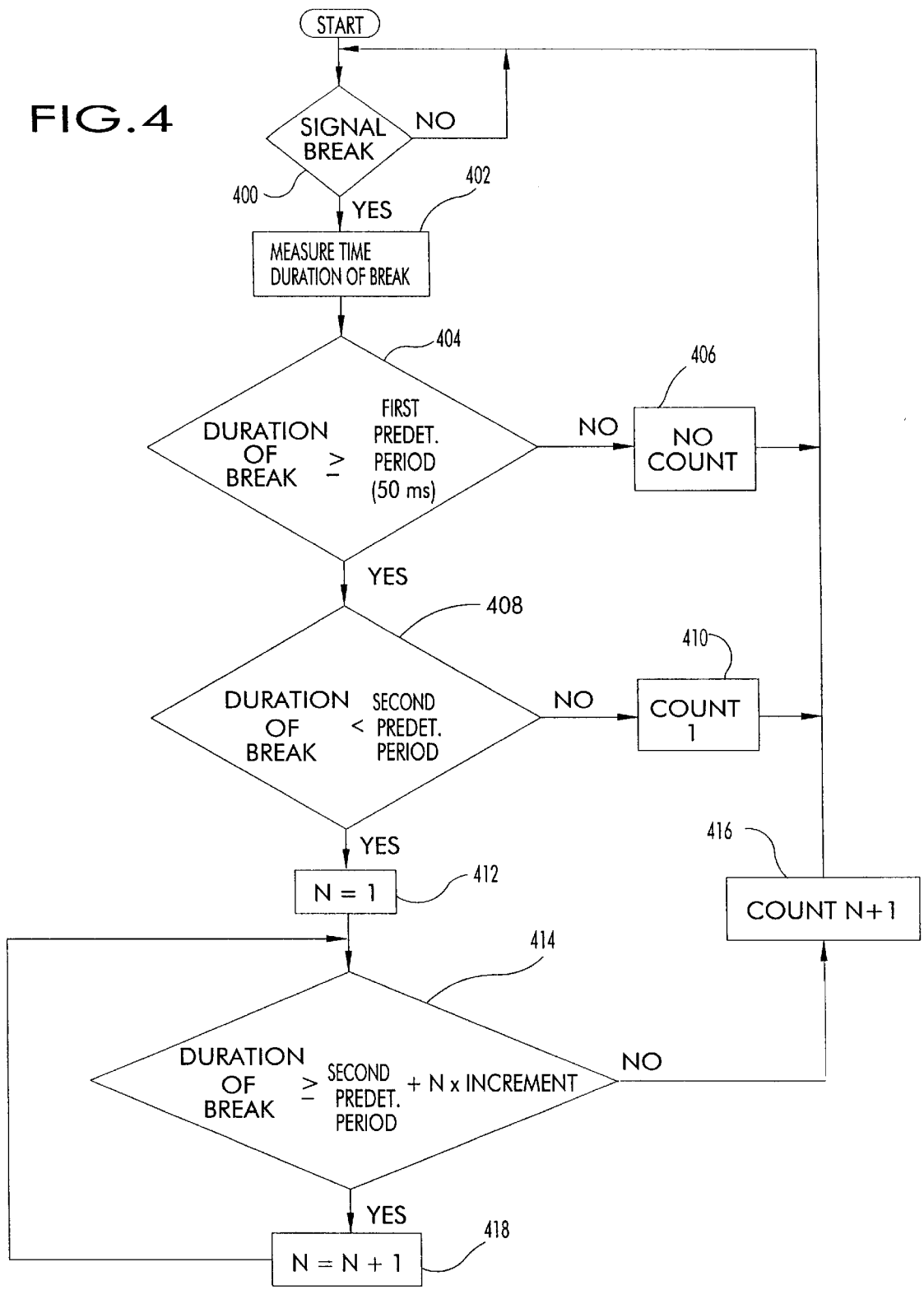

BIRD COUNTER

BRIEF SUMMARY OF THE INVENTION

This invention relates generally to bird counting devices and more particularly to a bird counting device capable of receiving and separating live birds, such as poultry, and counting the birds using a detecting system.

In the poultry industry, broiler and roaster chickens and other birds are raised in rearing houses having large enclosed areas where the birds are allowed to run free. The birds are then harvested by capturing and caging the birds before shipment to processing plants for slaughter. A standard broiler transport cage has a number of compartments and each compartment typically holds a certain number of birds. To ensure that the proper number of captured birds are placed in each compartment, the birds must be counted at some point in the harvesting operation before they are placed in the cages.

Presently, poultry may be harvested either manually by a large catching crew or by an automated bird harvesting device. Such a harvesting device is shown in U.S. Pat. No. 5,325,820, incorporated herein by reference, which discloses a harvester that captures and deposits a predetermined number of birds directly into a compartment of a cage. The harvesting device further includes an accelerator conveyor to separate the captured birds by accelerating their moving rate before they are counted. The harvesting device further includes a counting mechanism comprised of two rollers that deflect downwardly when a bird passes over them. The deflection of the rollers triggers sensors that generate a triggering signal to a CPU, thereby counting the birds.

The aforementioned apparatus for separating and counting birds has features which could be improved. For instance, when two birds pass over the rollers at nearly the same time, the rollers will deflect only once and thus one bird is counted where two should have been counted. The accelerator conveyor causes many of the birds to become disoriented and flap their wings, thus making them harder to count. Additionally, the accelerator conveyor only serves to increase the distance between birds, so that it does not serve to separate birds that are received on the conveyor side-by-side.

Accordingly, among the several objectives of the present invention include the provision of an automated bird counter which is capable of receiving birds substantially one at a time to separate the birds; the provision of such a bird counter which expels the birds substantially one at a time; the provision of such a bird counter which accurately detects the number of birds after the birds have been separated; the provision of such a bird counter which reduces the potential of bruising the birds and thereby increasing their market value; and the provision of such a bird counter which is easy to operate.

A further aspect of this invention includes the provision of an improved automated bird harvester which is capable of depositing a predetermined number of birds directly into a compartment of a cage; the provision of such a bird harvester which accurately counts the poultry so that only the predetermined number of birds is deposited into a compartment; the provision of such a bird harvester which is capable of capturing and depositing a large number of birds in cages having a plurality of compartments.

In one form, the invention comprises an apparatus for counting birds and includes counterrotating rotors having flexible fingers defining a space therebetween into which the birds are received and from which the received birds are expelled. The fingers draw the birds into the space substantially one at a time to separate the birds and to expel the birds from the space substantially one at a time. The invention also includes means for detecting the number of expelled birds after the birds have been separated by the counterrotating rotors.

In another form, the invention comprises an improved bird harvester for capturing birds on a generally horizontal plane, such as the floor of a bird house, and transferring a predetermined number of captured birds via a conveyor to a depositing means which deposits the predetermined number into a compartment of a cage having a plurality of compartments. The harvester is of the type having means for capturing the birds, means for counting the captured birds, means for conveying the captured birds, means for depositing the conveyed birds into each of the compartments of the cage, means for providing relative movement between the depositing means and the cage, and means, responsive to the counting means, for controlling said depositing means and said movement providing means to deposit the predetermined number of birds as counted by said counting means in each of the compartments of the cage. The harvester includes an improved counting means comprises counterrotating rotors having flexible fingers defining a space therebetween into which the captured birds are received and from which the received birds are expelled. The fingers draw the captured birds into the space substantially one at a time to separate the birds and to expel the birds from the space substantially one at a time. The counting means also includes means for detecting the number of expelled birds after the birds have been separated by the counterrotating rotors.

Other objects and features will be in part apparent and in part pointed out hereinafter.

BRIEF DESCRIPTION OF THE DRAWINGS

FIG. 3A is a partial plan view showing birds A, B and C being delivered at the entrance of the rotors;

FIG. 3B is a partial plan view following FIG. 3A showing bird A being received by the rotors with birds B and C following;

FIG. 3C is a partial plan view following FIG. 3B showing bird A between the optical fibers, bird B being received by the rotors, and birds C, D and E following;

FIG. 3D is a partial plan view following FIG. 3C showing bird B between the optical fibers, birds C and D being received by the rotors nearly simultaneously and bird E following;

FIG. 3E is a partial plan view following FIG. 3D showing birds C and D between the optical fibers nearly simultaneously, and bird E being received by the rotors; and FIG. 4 is a flow diagram showing the sequence of operation of the microprocessor of the invention.

DETAILED DESCRIPTION OF THE PREFERRED EMBODIMENT

Figure 1:
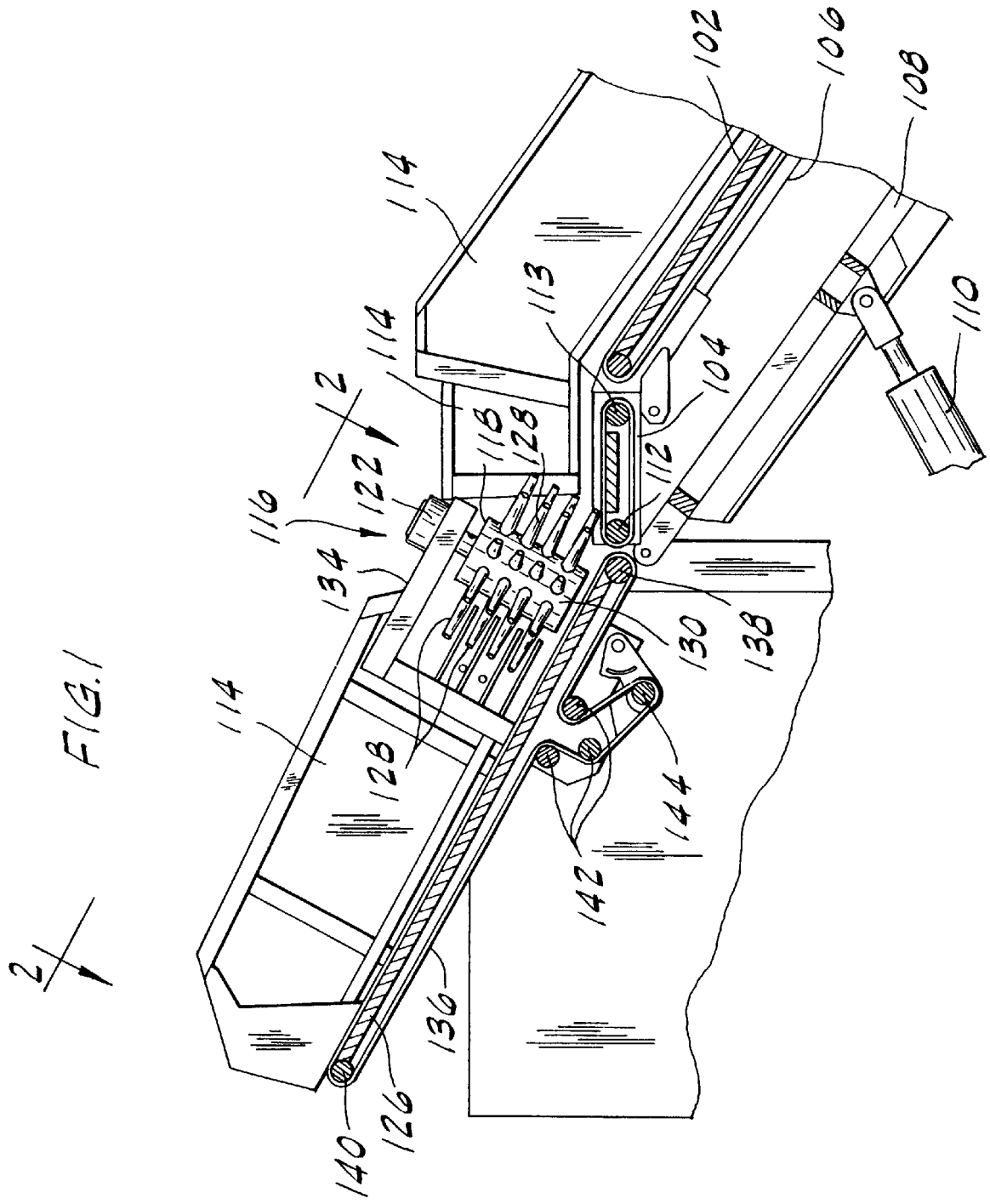
FIG. 1 is a side elevational view with parts removed of a portion of a bird harvester including a bird counter of the present invention.
Figure 2:
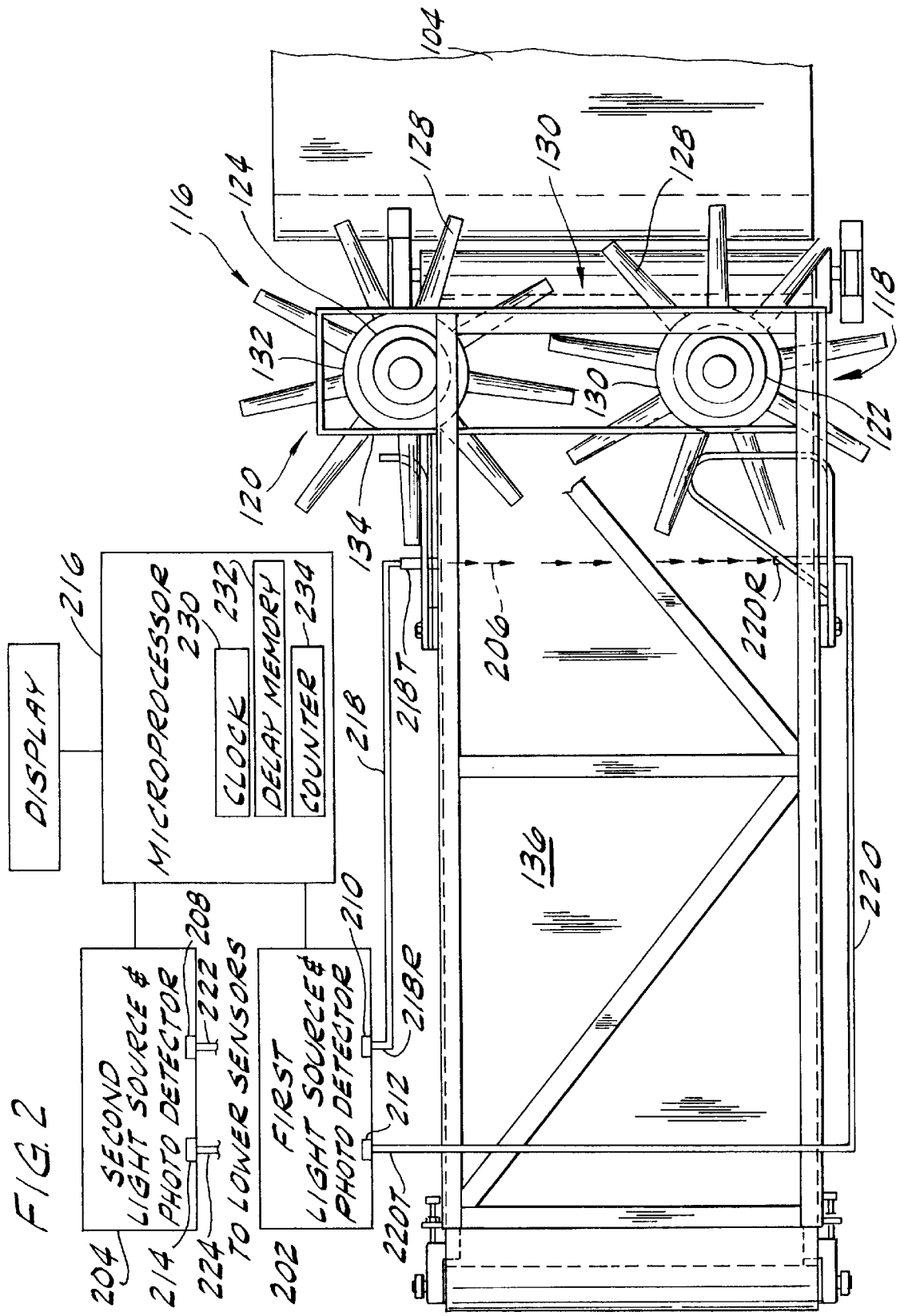
FIG. 2 is an illustration of the bird counter of the present invention including an enlarged partial view taken along line 2—2 in FIG. 1 and including a block diagram of the electronics of the bird counter.

Referring now to the drawings, FIGS. 1 and 2 indicate portions of a poultry harvester disclosed in U.S. Pat. No.

5,325,820, the entire disclosure of which is incorporated herein by reference, and a bird counter of the present invention. The poultry harvester captures live birds, counts the birds, conveys the birds and deposits a predetermined number of the birds into a compartment of a cage. The preferred embodiment of the present invention performs the counting function of the poultry harvester disclosed in U.S. Pat. No. 5,325,820. The present invention is particularly applicable to chickens and poultry, but it is also applicable to other birds. The present invention utilizes a counterrotating rotor mechanism mounted over a tiltable conveyor that receives birds from an intermediate conveyor and expels them onto a tiltable conveyor. The embodiment further utilizes electronics including optical fibers, photodetectors, light sources and a microprocessor. It will be understood that the present invention may be used to count birds in a variety of environments, including use in a bird processing plant.

A primary conveyor 102 shown in FIG. 1 is described in detail in U.S. Pat. No. 5,325,820 and is described only generally herein. The primary conveyor moves the captured birds from the forward end of the harvester where the birds are captured or collected and delivers them to an intermediate conveyor 104. The primary conveyor 102 is supported by a support frame 106 and a chassis 108. The angle of the primary conveyor 102 may be changed by a hydraulic piston 110 attached to the support frame.

The intermediate conveyor 104 in FIG. 1 is positioned after the primary conveyor 102 and before a rotor mechanism described below. The intermediate conveyor 104 receives captured birds (not shown) from the primary conveyor 102 and delivers the captured birds horizontally into the rotor mechanism. However, the Intermediate conveyor 104 is not essential to this embodiment and it is contemplated that the intermediate conveyor may be omitted, so that the primary conveyor would deliver birds directly into the rotor mechanism. U.S. Pat. No. 5,325,820 referred to the intermediate conveyor as the "accelerator" conveyor because the conveyor served to accelerate the moving rate of the birds. Generally, the intermediate conveyor is a relatively short horizontal conveyor comprising two rollers 112, 113, one of which is driven by a hydraulic drive (not shown) for moving a belt about the rollers, and supported (as described in U.S. Pat. No. 5,325,820) by a support frame which also supports the primary conveyor. In this preferred embodiment, the intermediate conveyor 104 need not accelerate the moving rate of the birds. Although the intermediate conveyor is narrower in width than the primary conveyor, so that fewer birds may be carried side-by-side on the conveyor, this is an optional aspect of the invention. There are a plurality of removable hoods 114 which cover the primary and intermediate conveyors and the tiltable conveyor described below. As described in U.S. Pat. No. 5,325, 820, the hoods enclose the conveyors to prevent escape by the birds during harvesting and serve to direct the birds from the primary to the intermediate conveyor.

The rotor mechanism 116 of the present invention, shown in FIGS. 1–3E, includes two counterrotating rotors 118, 120 and two hydraulic motors 122, 124. The mechanism 116 is positioned immediately after the intermediate conveyor 104 and over a tiltable conveyor 126. The counterrotating rotors have flexible fingers 128 defining a space therebetween into which the birds are received substantially one at a time, and from which the received birds are expelled. The rotors are constructed generally the same as disclosed in U.S. Pat. No. 4,508,062, the entire disclosure of which is incorporated herein by reference. Each counterrotating rotor 118, 120 has a continuous array of thirty-six flexible, radially extending fingers 128 arranged in four tiers of nine fingers each, attached to a rotor barrel 130, 132. The fingers are evenly spaced around the rotor barrel, so that when looking down the axis of the rotor, there are nine columns of four fingers extending from the rotor. Each rotor is attached to the shaft of a hydraulic motor 122, 124 and driven by the hydraulic motor, which is connected to a hydraulic system by flexible lines so that the motors may tilt with the tiltable conveyor. Each rotor and its drive motor comprise an assembly supported by a forward frame member 134 mounted horizontally over the front end of the tiltable conveyor and attached to the tiltable conveyor. The motor is positioned above the frame member 134 and the rotors are positioned below the frame member such that the rotors are suspended above the tiltable conveyor. The rotors 118, 120 extend forward of the front end of the tiltable conveyor to grasp or draw the birds from the adjacent intermediate conveyor and receive the birds between the rotors. Rotor 118 rotates counterclockwise, rotor 120 rotates clockwise, such that birds on the intermediate conveyor are drawn in between the counterrotating rotors 118 and 120. The rotor-motor assemblies are arranged side-by-side, fifteen inches from center to center, each rotor rotatable about a generally vertical axis. The two rotors together occupy an area wider than the width of the intermediate conveyor 104 so that substantially all birds on the intermediate conveyor are received by the rotors.

Figure 3A:
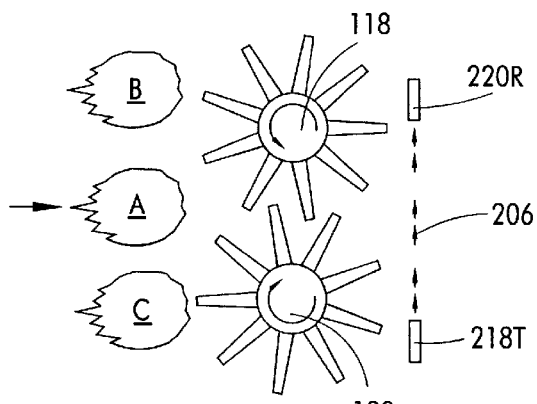
FIGS. 3A–E are a series of views showing the bird counter with a progression of several birds as they are received, expelled and detected by the bird counter.
Figure 3B:
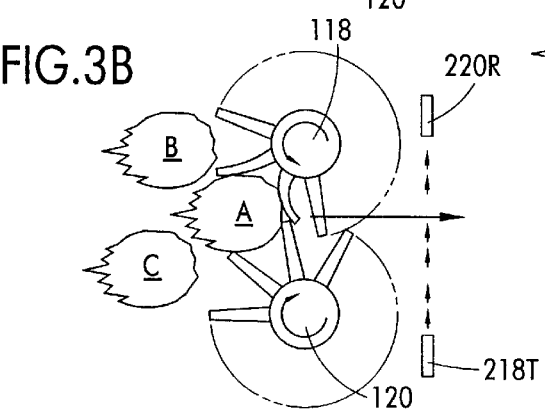
Figure 3D:
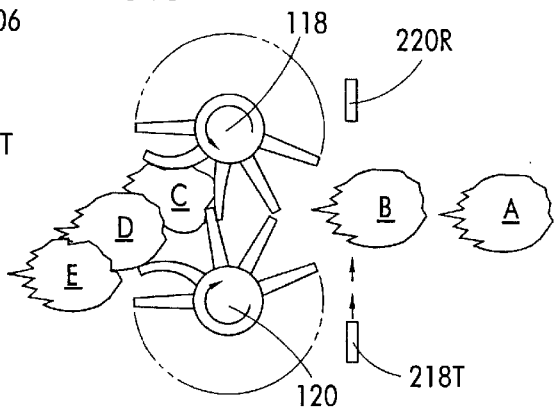
Figure 3E:
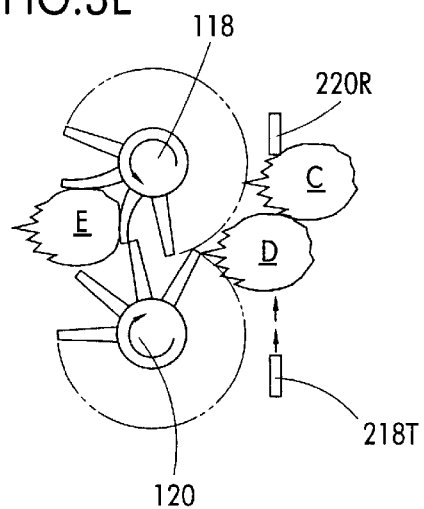

Referring to FIGS. 3A–3E, the space between the interlocking flexible fingers of the counterrotating rotors is configured such that substantially one bird will be received into the rotors and then expelled from the rotors at a time. If two or more birds are conveyed to the rotors side-by-side, as in birds A, B and C in FIGS. 3A–B, bird A (which is centrally located at the intersection of the rotor fingers) will tend to be received first between the rotors, while birds B and C move along the rotor fingertips towards the intersection of the rotor fingers. Thereafter, in FIG. 3C, bird A is expelled by the rotors and bird B is received by the rotors. Because the rotors tend to accept one bird at a time, the rotors serve to separate any birds that are delivered bunched together so that birds are individually expelled to facilitate counting. FIG. 3D illustrates the unlikely scenario wherein two birds are received between the rotors nearly simultaneously. As shown, birds C and D approach the rotors very close and side-by-side one another and are received together between the rotors. Consequently, as shown in FIG. 3E, birds C and D are expelled together.

In the preferred embodiment, the fingers of a rotor interlock with the fingers of the other rotor. However, it is to be understood that the fingers need not necessarily interlock, i.e., the rotor barrel diameter, finger length or the distance between rotors could be changed (possibly depending on bird size) so that the fingers would not interlock. Additionally, the counterrotating rotor mechanism could also function with more than two rotors. For instance, a rotor could be mounted to rotate on a horizontal axis forward of and above the rotors or a second set of two rotors could be added to aid in controlling the birds or to increase the effective width of the rotor mechanism.

A plurality of bent steel rods are mounted onto the forward frame member of the tiltable conveyor for realigning the fingers and preventing the interentanglement of the fingers. The rods are welded to brackets attached to the forward frame member by suitable fasteners (e.g., nut and bolt fasteners). The brackets support the rods in a position to engage the fingers as each rotor rotates; one rod is provided between each tier of fingers.

Preferably, the hydraulic motors rotate the counterrotating rotors at a rotational rate so as to expel the birds at a linear moving rate which is greater (e.g., 400 feet per minute) than a delivery rate at which the birds are supplied by the intermediate conveyor (e.g., 150 feet per minute). As a result, birds moving from the intermediate conveyor are accelerated upon being drawn in between the rotors, such that a distance between the expelled birds is greater than a corresponding distance between the supplied birds. For example, the distance between birds A and B in FIG. 3D is greater than the distance between birds A and B in FIG. 3B.

It is to be understood that the counterrotating rotors of the present invention are capable of accepting birds from means other than a conveyor, including means that would deliver the birds at a very slow delivery rate, such as human hands feeding the birds directly into the rotors. Additionally, the counterrotating rotors may be used to count birds delivered by a conveyor in a processing plant.

The birds are expelled by the counterrotating rotors onto the tiltable conveyor 126 for conveyance past a bird detecting system. The tiltable conveyor is described in detail in U.S. Pat. No. 5,325,820 and described only generally herein. The tiltable conveyor 126 includes a tiltable conveyor belt 136 movable over two spaced apart rollers 138 and 140. Roller 138 is adjacent to and parallel with an intermediate conveyor roller 112, three free wheeling rollers 142, and a drive roller 144 driven by a hydraulic motor (not shown). The tiltable conveyor belt 136 is narrower in width than the intermediate conveyor 104 (as shown in FIG. 2) and the primary conveyor, though it is contemplated that the width of all three conveyors may be the same. A stainless steel shield (not shown) may be positioned above the tiltable conveyor belt and directly beneath the rotors to allow the rotors by themselves to convey the birds. The tiltable conveyor 126 moves the birds at a slower moving rate (e.g., 250 feet per minute) than the rate at which they are expelled from the rotors (but faster than the moving rate of the intermediate conveyor) so as to aid the birds in reorienting themselves during conveyance on the tiltable conveyor 126. The tiltable conveyor 126 is pivotally mounted about roller 138 on a chassis and is pivotally mounted at its rearward end about roller 140. The rotor mechanism and the bird detecting system are mounted on the forward frame member 134 extending above the forward surface of the tiltable conveyor belt such that the rotor mechanism and bird detecting system tilts with the tiltable conveyor and thus the rotors remain in the same relation to the tiltable conveyor belt. FIG. 2 shows that a center line of the rotor mechanism 116 is not collinear with a center line of the tiltable conveyor 126, while the center line of the rotor mechanism 116 is collinear with that of the intermediate conveyor 104. It is contemplated that the position of the rotors or the tiltable or intermediate conveyors could be changed; for example, the centerlines could be collinear.

The bird detecting system of the present invention detects the number of expelled birds after the birds have been separated by the counterrotating rotors 118, 120. As shown in FIGS. 1 and 2, the bird detecting system utilizes first and second light source and photodetector assembly 202, 204, each of which includes a light source 208, 210 which generates a light beam 206 positioned in the path of birds expelled from the counterrotating rotors. Each assembly 202, 204 also includes a photodetector 212, 214 for detecting the light beam 206 and for generating a signal when the light beam is present, whereby a break in the signal comprises a triggering signal that indicates that a bird has been expelled from the counterrotating rotors. The bird detecting system includes a microprocessor 216 for counting each of the signal breaks that correspond to at least one counted bird.

Each light source and photodetector assembly 202, 204 of the preferred embodiment includes a light beam generator comprising two optical fibers 218, 220, 222, 224 transmitting light generated by the light source 208, 210. The first assembly has a first optical fiber 218 and a second optical fiber 220 of the same type, such as Banner Manufacturing Model No. IT23S. Optical fiber 218 has a receiving end 218R collecting light from the light source 210 and a transmitting end 218T providing the light beam 206. Optical fiber 220 has a receiving end 220R receiving the transmitted light beam 206 and a transmitting end 220T providing the received light to the photodetector 212. The transmitting end 218T is aimed directly at the receiving end 220R and is aimed transverse to the direction of movement of the conveyors, such that birds conveyed on the conveyor will break the light beam. The transmitting end 218T and the receiving end 220R are positioned horizontally immediately after the rotors, approximately four inches above the tiltable conveyor belt 136. The second assembly 204 is constructed substantially the same as the first assembly 202 with the exception that the transmitting end of fiber 222 and the receiving end of fiber 224 are positioned approximately six inches above the tiltable conveyor belt 136. There are two assemblies included to ensure that substantially all expelled birds, even birds that are not fully upright or that are larger than average height, will interrupt at least one of the light beams and thus be counted. It is contemplated that the height of the optical fibers may vary due to factors such as the type, size and height of the birds. It is also contemplated that one or more than two light beam generators may be used.

The light source and photodetector assemblies 202, 204 in the preferred embodiment each comprise one unit, such as Banner Manufacturing Model No. SM312F, mounted in a convenient position such as on the forward frame member 134. The light source 210 generates the light beam 206 which is conducted through the optical fibers 218, 220 and received by the photodetector 212. The photodetector 212 generates a triggering signal when the light beam 206 transmitted between the fibers is interrupted by a bird indicating that the bird has been expelled from the counterrotating rotors 116. In the preferred embodiment, the photodetector senses the light beam 206 and generates a 10 volt signal to be transmitted through cable to the microprocessor 216. It is contemplated that a different detector, such as an infrared detector may be used, and further, that the signal may be generated when the detector does not detect the light beam. A break in the 10 volt signal comprises the triggering signal and indicates that a bird has been expelled from the counterrotating rotors.

FIG. 4 is a flow chart illustrating the general operation of the microprocessor. The microprocessor 216 counts each of the triggering signals that correspond to at least one counted bird. The microprocessor 216 inhibits the counting of a particular triggering signal when a period of time or duration between the particular triggering signal and a previous triggering signal is less than a predetermined period. The microprocessor 216 is further provided for counting each of the triggering signals as corresponding to one bird and counting each of the triggering signals as corresponding to two or more birds when the duration of the triggering signal is greater than a second predetermined period. A triggering signal of greater duration than the second predetermined period indicates at least two counted birds.

The microprocessor 216 monitors the signal from the assemblies 202, 204 at step 400. If a break in the signal is detected, the microprocessor 216 proceeds to step 402 whereupon the microprocessor determines the duration of the signal break based on its internal clock 230. The duration of the signal break is the difference of time between the start and end of the signal break. At step 404, the microprocessor then compares the duration of the signal break to the first predetermined period, e.g., 50 milliseconds, stored in delay memory 232. If the duration of the signal break is less than the predetermined period the signal break was likely caused by an object other than a bird body, e.g., a bird leg or wing extending from the bird body, which caused a momentary break in the light beam. If the duration of the signal break is less than 50 milliseconds, the microprocessor 216 proceeds to step 406 and will not increase the bird count stored in counter memory 234. The microprocessor 216 then returns to step 400 to monitor the signal. If the duration is greater than or equal to the first predetermined period, the microprocessor proceeds to step 408 to determine the number of birds to be counted, i.e., the number stored in counter 234.

If the duration of the signal break is less than the second predetermined period, e.g., 300 milliseconds stored in delay memory 232 (and greater than or equal to the first predetermined period), the microprocessor 216 proceeds to step 410 to increase the bird count by one and the microprocessor 216 returns to step 400 to monitor the signal. If the duration of the signal break is greater than or equal to the second predetermined period, it is assumed that at least two birds have broken the light beam with no separation between birds. The microprocessor 216 then determines the number of birds to be counted. The microprocessor runs through a loop using a variable 'N' that is initially equal to one at step 412. If at step 414 the duration is less than the second predetermined period plus 'N' multiplied by an increment, the loop ends and the count in counter 234 is increased by 'N' plus one at step 416. If the duration is equal to or greater than the second predetermined period plus 'N' multiplied by the increment, the loop continues, with the variable 'N' being increased by one at step 418. For example, if the second predetermined period is 300 milliseconds and the increment is 300 milliseconds, a signal break of 600 milliseconds would yield a count of three birds. Thus, the program calculates the number of birds that interrupted the light beam using the duration of the signal break. A display reveals the current count, the predetermined periods and the increment. The predetermined periods and increment can be changed to account for different moving rates, the size and type of the birds or for other reasons.

As a further example, the following table indicates the number of birds to be counted for several sample signal break durations, using the predetermined periods and increment assumed above:

| Signal Break Duration (milliseconds) | Count (number of birds) | Signal Break Duration | Count (number of birds) |
| --- | --- | --- | --- |
| 49 | 0 | 300 | 2 |
| 50 | 1 | 599 | 2 |
| 299 | 1 | 600 | 3 |

Figure 3C:
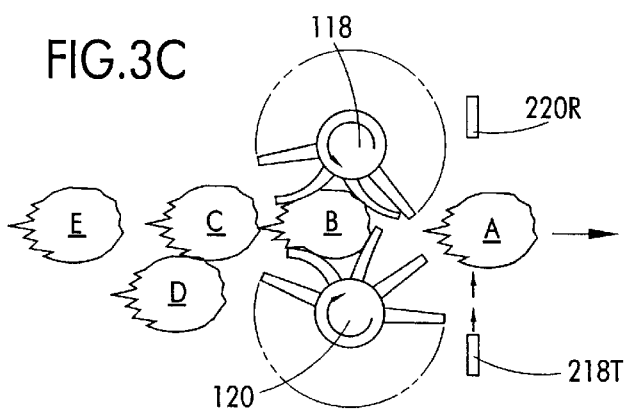

FIGS. 3A–E illustrate the operation of the rotors and the optical fibers in several possible scenarios. In FIG. 3A, three birds, A, B, and C, approach the rotors on the intermediate conveyor three abreast. FIGS. 3B–C illustrate the separation function of the rotors. In FIG. 3B, bird A is first accepted into the rotors. Then, in FIG. 3C, bird B is accepted after A has been expelled and is passing between the optical fibers to break the light beam 206. FIGS. 3D–E illustrate the less common scenario where the rotors fail to separate the birds and the birds pass the optical fibers without each bird causing a separate interruption in the light beam and thus no separate break in the signal to the microprocessor 216. In FIG. 3D, birds C and D are accepted into the space between the rotors together while bird B breaks the beam 206 and is counted. In FIG. 3E, birds C and D pass between the optical fibers such that the light beam 206 is continuously interrupted, without being re-established between the birds. The microprocessor will then interpret the signal break as discussed above, and if the break is longer than the second predetermined period, at least two birds will be counted.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A counting apparatus in combination with a bird harvester having bird capturing means, the counting apparatus for counting birds which have been captured by the bird capturing means of the bird harvester, the counting apparatus comprising:

counterrotating rotors adapted to be mounted on the bird harvester for receiving the birds after the birds have been captured by the bird capturing means, said rotors having flexible fingers defining a space therebetween into which the captured birds are received and from which the received birds are expelled, the rotors operating at a rate such that the fingers draw the birds into the space substantially one at a time which tends to separate the birds in the direction of travel of the birds and to expel the birds from the space substantially one at a time; and means for detecting the number of captured, expelled birds after said birds have been captured by the bird capturing means and expelled by the counterrotating rotors.

2. An apparatus for counting birds as set forth in claim 1 wherein the birds are being supplied to the counterrotating rotors at a delivery rate, and further comprising means for rotating the rotors such that the rotors move the birds through the space between the rotors at a moving rate which is greater than the delivery rate to separate the birds as the birds are expelled from the rotors.

3. A counting apparatus in combination with bird capturing means, the counting apparatus for counting birds which have been captured by the bird capturing means, said counting apparatus comprising:

counterrotating interlocking rotors for receiving the birds after the birds have been captured by the bird capturing means, said rotors having flexible fingers defining a space therebetween into which the captured birds are received and from which the received birds are expelled, wherein the birds are being supplied to the counterrotating rotors at a delivery rate and wherein the expulsion rate is substantially three times the delivery rate so that the fingers draw the birds into the space substantially one at a time which tends to separate the birds in the direction of travel of the birds and to expel the birds from the space is substantially one at a time; and means for detecting the number of captured, excelled birds after said birds have been captured by the bird capturing means and expelled by the counterrotating rotors.

4. A counting apparatus in combination with bird capturing means, the counting apparatus for counting birds which have been captured by the bird capturing means, said counting apparatus comprising:

counterrotating rotors for receiving the birds after the birds have been captured by the bird capturing means, said rotors having flexible fingers defining a space therebetween into which the captured birds are received and from which the received birds are expelled, wherein the birds are being supplied to the counterrotating rotors at a delivery rate;

means for detecting the number of captured, excelled birds after said birds have been captured by the bird capturing means and expelled by the counterrotating rotors; and the rotors being adapted to rotate at a rate such that the birds move through the space and are expelled at a rate which is greater than the delivery rate so that the fingers draw the birds into the space substantially one at a time which tends to separate the birds and to expel the birds from the space substantially one at a time such that a distance between the expelled birds tends to be greater than a corresponding distance between the supplied birds whereby the birds are expelled from the rotors in the direction of travel of the birds before being detected by the detecting means.

5. The apparatus for counting birds as set forth in claim 4 wherein the rotors are interlocking and the expulsion rate is substantially three times the delivery rate.

6. A counting apparatus in combination with bird capturing means, the counting apparatus for counting birds which have been captured by the bird capturing means, the counting apparatus comprising:

counterrotating rotors for receiving the birds after the birds have been captured by the bird capturing means, said rotors having flexible fingers defining a space therebetween into which the birds are received and from which the received birds are expelled, the fingers drawing the birds into the space substantially one at a time to separate the birds and to expel the birds from the space substantially one at a time; and means for detecting the number of captured, expelled birds after said birds have been captured by the bird capturing means and expelled by the counterrotating rotors;

wherein said detecting means comprises a generator generating a light beam positioned in a path of birds expelled from the counterrotating rotors and a detector for generating a triggering signal when the light beam is interrupted thereby indicating that a bird has been expelled from the counterrotating rotors.

7. An apparatus for counting birds as set forth in claim 6 including a detector for detecting the light beam and for generating a signal when the light beam is detected, whereby a break in said signal comprises the triggering signal and indicates that a bird has been expelled from the counterrotating rotors.

8. A counting apparatus in combination with bird capturing means, the counting apparatus for counting birds which have been captured by the bird capturing means, said counting apparatus comprising:

counterrotating rotors for receiving the birds after the birds have been captured by the bird capturing means, said rotors having flexible fingers defining a space therebetween into which the captured birds are received and from which the received birds are expelled, the fingers drawing the birds into the space substantially one at a time which tends to separate the birds and to expel the birds from the space substantially one at a time;

means positioned after the counterrotating rotors for receiving the captured, expelled birds and for detecting the number of captured, expelled birds after said birds have been captured by the bird capturing means and expelled by the counterrotating rotors;

the detecting means comprising a generator generating a light beam positioned in a path of captured birds expelled from the counterrotating rotors and a detector for generating a triggering signal when the light beam is interrupted thereby indicating that a captured bird has been expelled from the counterrotating rotors.

9. An apparatus for counting birds as set forth in claim 8 wherein the detector generates a triggering signal when the beam is interrupted and further comprising means for counting each of the triggering signals as corresponding to one bird and means for inhibiting the counting of a particular triggering signal when the particular triggering signal indicates that the duration of interruption of the beam is less than a predetermined period whereby an interruption of the beam of lesser duration than the predetermined period is not counted.

10. An apparatus for counting birds as set forth in claim 9 wherein the predetermined period is approximately 40 to 70 milliseconds.

11. The apparatus of claim 8 wherein said detecting means further comprises a second generator generating a second light beam positioned in the path of birds expelled from the counterrotating rotors and a second detector for detecting the second light beam and for generating a second triggering signal when the second light beam is interrupted.

12. An apparatus for counting birds as set forth in claim 11 wherein said first light beam generator is positioned above the second light beam generator so that the first light beam is above the second light beam whereby substantially all expelled birds will interrupt at least one of the light beams.

13. An apparatus for counting birds as set forth in claim 11 wherein each said triggering signal is generated during periods when its light beam is interrupted, and further comprising means for counting each of the triggering signals as corresponding to one bird and means for counting each of the triggering signals as corresponding to two or more birds when the triggering signal indicates that the duration of the interruption of the beam is greater than a predetermined period whereby an interruption of the beam of greater duration than the predetermined period indicates at least two counted birds.

14. An apparatus for counting birds as set forth in claim 13 wherein the predetermined period is approximately 300 milliseconds.

15. An apparatus for counting captured birds comprising:

counterrotating rotors having flexible fingers defining a space therebetween into which the captured birds are received and from which the received birds are expelled, the fingers drawing the birds into the space substantially one at a time which tends to separate the birds and to expel the birds from the space substantially one at a time;

means for detecting the number of birds after said birds have been expelled by the counterrotating rotors;

the detecting means comprising a generator generating a light beam positioned in a path of birds expelled from the counterrotating rotors and a detector for generating a signal when the light beam is interrupted; and means for counting each of the triggering signals as corresponding to one bird; and means for inhibiting the counting of a particular triggering signal when the particular triggering signal indicates that the duration of interruption of the beam is less than a predetermined period whereby an interruption of the beam of lesser duration than the predetermined period is not counted.

16. An apparatus for counting birds as set forth in claim 15 wherein the predetermined period is approximately 40 to 70 milliseconds.

17. An apparatus for counting captured birds comprising:

counterrotating rotors having flexible fingers defining a space therebetween into which the captured birds are received and from which the received birds are expelled, the fingers drawing the birds into the space substantially one at a time which tends to separate the birds and to expel the birds from the space substantially one at a time;

means for detecting the number of birds after said birds have been expelled by the counterrotating rotors;

the detecting means comprising a generator generating a light beam positioned in a path of birds expelled from the counterrotating rotors and a detector for generating a signal when the light beam is interrupted thereby indicating that a bird has been expelled from the counterrotating rotors; and means for counting each of the triggering signals as corresponding to one bird and means for counting each of the triggering signals as corresponding to two or more birds when the triggering signal indicates that the duration of the interruption of the beam is greater than a predetermined period whereby an interruption of the beam of greater duration than the predetermined period indicates at least two counted birds.

18. An apparatus for counting birds as set forth in claim 17 wherein the predetermined period is approximately 300 milliseconds.

19. An apparatus for counting captured birds, the apparatus comprising:

counterrotating rotors having flexible fingers defining a space therebetween into which the captured birds are received and from which the received birds are expelled, the fingers drawing the birds into the space substantially one at a time which tends to separate the birds and to expel the birds from the space substantially one at a time;

means for detecting the number of birds after said birds have been expelled by the counterrotating rotors;

the detecting means comprising a generator generating a light beam positioned in a path of birds expelled from the counterrotating rotors and a detector for generating a signal when the light beam is interrupted thereby indicating that a bird has been expelled from the counterrotating rotors;

the light beam generator further comprising a first optical fiber having a receiving end adjacent a light source and having a transmitting end providing the light beam; and a second optical fiber having a receiving end positioned to receive the light beam and having a transmitting end adjacent a photodetector, said photodetector generating a triggering signal indicating an interruption in the light beam.

20. An improved bird harvester for capturing birds on a generally horizontal plane, such as the floor of a bird house, and transferring a predetermined number of captured birds via a conveyor to a depositing means which deposits the predetermined number into a compartment of a cage having a plurality of compartments, said improved bird harvester having:

means for capturing the birds, means for counting the captured birds, means for conveying the captured birds, means for depositing the conveyed birds into each of the compartments of the cage, means for providing relative movement between the depositing means and the cage, and means, responsive to the counting means, for controlling said depositing means and said movement providing means to deposit the predetermined number of birds as counted by said counting means in each of the compartments of the cage, wherein the improved counting means comprises:

counterrotating rotors adapted to be mounted on the harvester for receiving the birds after the birds have been captured by the capturing means, said rotors having flexible fingers defining a space therebetween into which the captured birds are received and from which the received birds are expelled, the fingers drawing the captured birds into the space substantially one at a time which tends to separate the birds in the direction of travel of the birds and to expel the birds from the space substantially one at a time; and means for detecting the number of captured, expelled birds after said birds have been captured by the capturing means and expelled by the counterrotating rotors.

21. An improved bird harvester for capturing birds as set forth in claim 20 wherein the means for conveying the captured birds includes a conveyor for conveying the captured birds from the capturing means to the counterrotating rotors and a tiltable conveyor over which the counterrotating rotors are positioned for conveying the captured birds from the counterrotating rotors toward the depositing means.

* * * * *